United States Patent
Mazyan

(10) Patent No.: US 8,746,779 B1
(45) Date of Patent: Jun. 10, 2014

(54) TRI-WING SYSTEM FOR REDUCTION OF THE AERODYNAMIC DRAG OF GROUND VEHICLES

(71) Applicant: Walid Ibrahim Mazyan, Sharjah (AE)

(72) Inventor: Walid Ibrahim Mazyan, Sharjah (AE)

( * ) Notice: Subject to any disclaimer, the term of this patent is extended or adjusted under 35 U.S.C. 154(b) by 0 days.

(21) Appl. No.: 13/875,110

(22) Filed: May 1, 2013

Related U.S. Application Data

(60) Provisional application No. 61/769,457, filed on Feb. 26, 2013.

(51) Int. Cl.
   *B62D 35/00* (2006.01)
   *B62D 35/02* (2006.01)

(52) U.S. Cl.
   USPC .................................... 296/180.2; 296/180.4

(58) Field of Classification Search
   USPC .......................................... 296/180.1–180.5
   See application file for complete search history.

(56) References Cited

U.S. PATENT DOCUMENTS

| | | | | |
|---|---|---|---|---|
| 3,647,257 | A * | 3/1972 | Litchfield | 296/91 |
| 3,960,402 | A * | 6/1976 | Keck | 296/180.4 |
| 4,726,618 | A * | 2/1988 | Hansen | 296/91 |
| 5,280,990 | A * | 1/1994 | Rinard | 296/180.1 |
| 6,224,135 | B1 * | 5/2001 | Rehkopf | 296/91 |
| 6,260,911 | B1 * | 7/2001 | Becker | 296/180.2 |
| 7,641,262 | B2 * | 1/2010 | Nusbaum | 296/180.5 |
| 8,540,304 | B2 * | 9/2013 | Kint | 296/180.1 |
| 2013/0088039 | A1 * | 4/2013 | Feight et al. | 296/180.2 |

FOREIGN PATENT DOCUMENTS

EP   1035006   *   9/2000

* cited by examiner

*Primary Examiner* — Dennis H Pedder
(74) *Attorney, Agent, or Firm* — Amin, Turocy & Watson, LLP

(57) ABSTRACT

A tri-wing system for reduction of aerodynamic drag on a ground vehicle comprises one or more wings designed to redirect airflow toward low pressure areas behind the ground vehicle. The wings are mountable a bottom rear of the vehicle, a bottom rear of a trailer attached to the ground vehicle, and/or a top rear of the trailer attached to the ground vehicle. Airflow travels through a gap between an inner surface of the wing and the vehicle and is redirected toward an area behind the vehicle at an angle relative to the mounting surface of the vehicle. The increase in the pressure behind the vehicle can reduce the total drag force on the vehicle, thereby reducing fuel consumption.

20 Claims, 11 Drawing Sheets

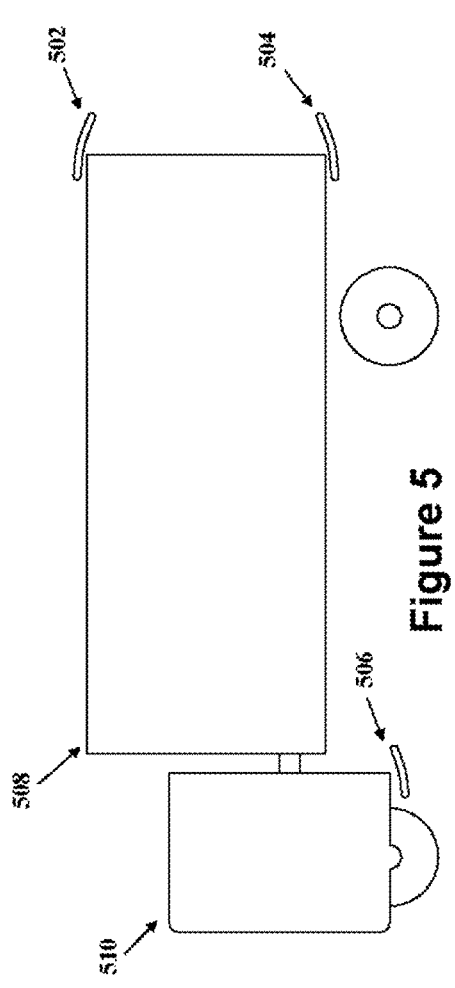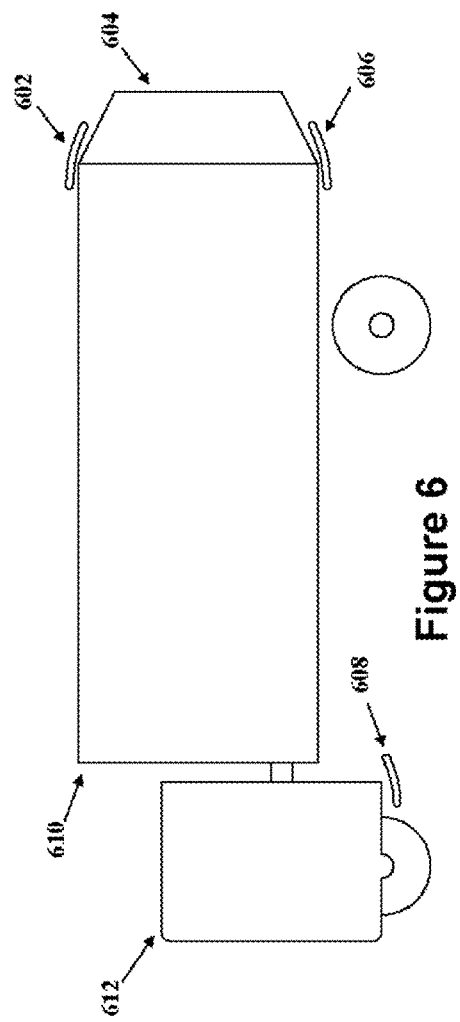

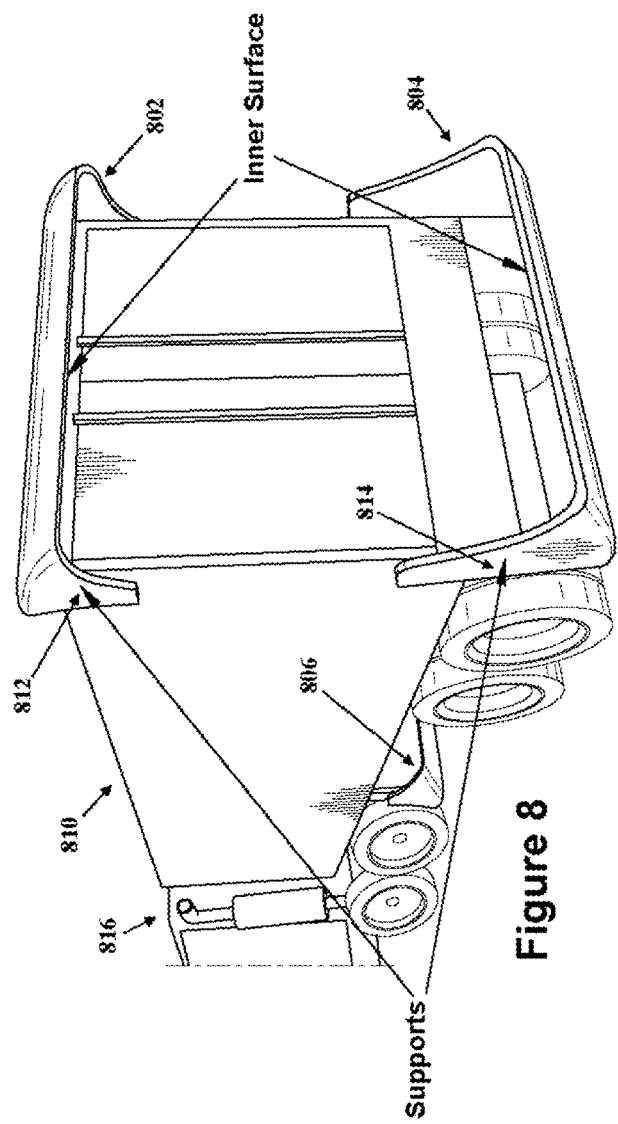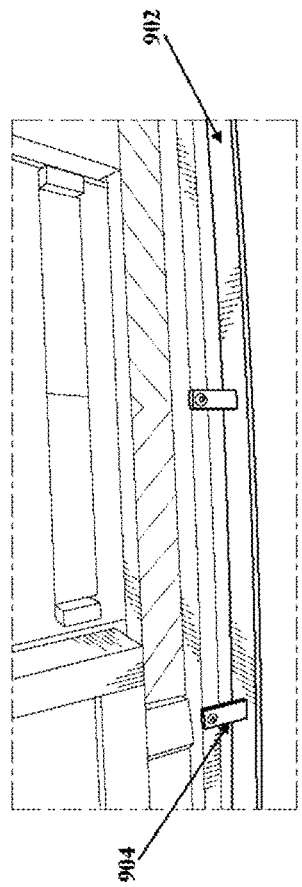

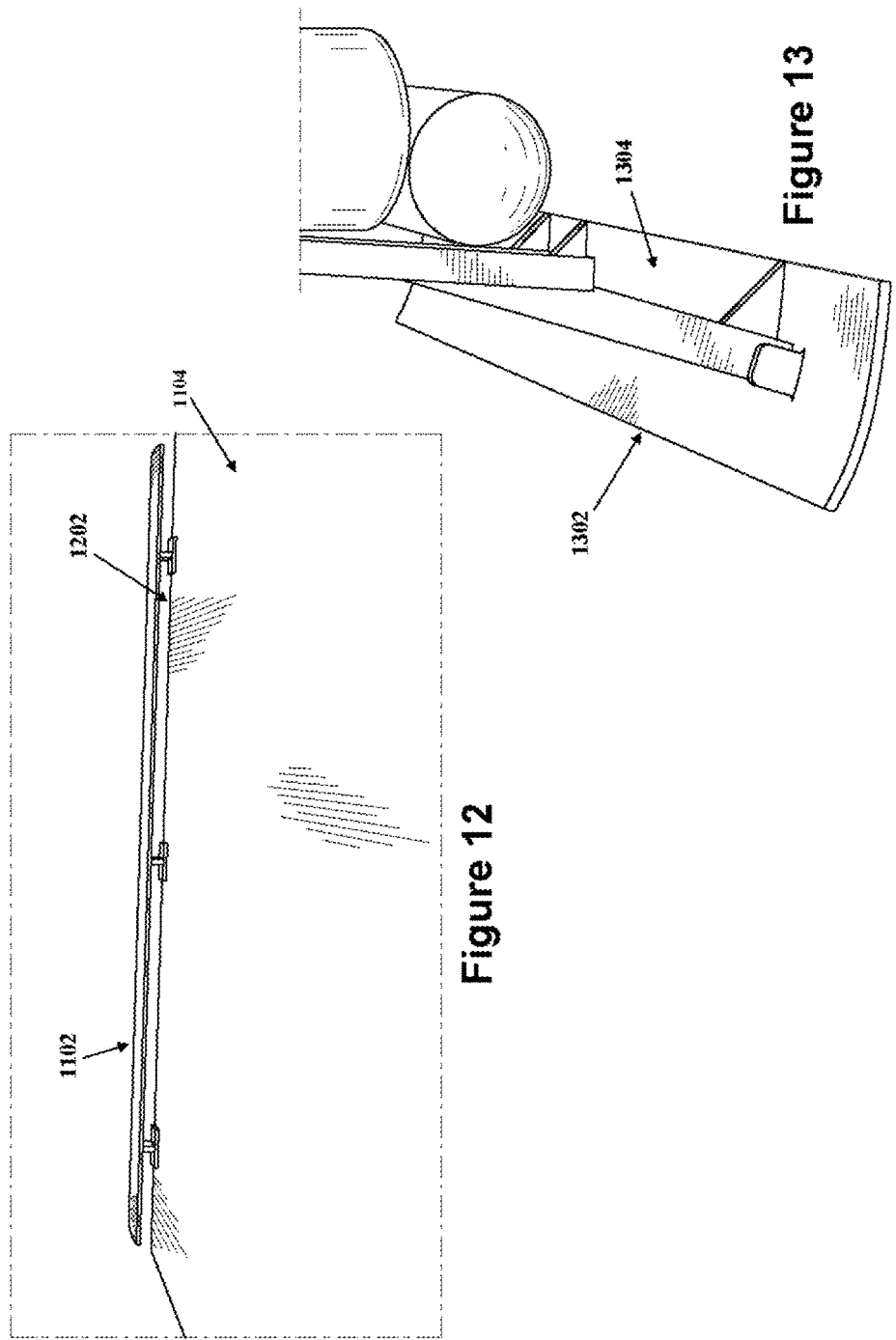

TRI-WING SYSTEM FOR REDUCTION OF THE AERODYNAMIC DRAG OF GROUND VEHICLES

CROSS-REFERENCE TO RELATED APPLICATIONS

This application claims priority to U.S. Provisional Application No. 61/769,457, filed on Feb. 26, 2013, entitled "THE TRI-WING SYSTEM FOR REDUCING THE AERODYNAMIC DRAG OF GROUND VEHICLES," the entirety of which is incorporated herein by reference.

TECHNICAL FIELD

This disclosure relates generally to reducing aerodynamic drag on a ground vehicle, e.g., to reduce fuel consumption.

BACKGROUND

FIGS. 1 and 2 illustrate an exemplary system drag reduction (SDR) device for reducing drag of a vehicle 202 due to wind resistance. Such SDRs include a rear diffuser 102 that directs airflow toward the rear of the vehicle at large angles and from the top side of the trailer only.

An aim of the rear diffuser 102 is to direct the flow at a high angle of attack (conventionally around 60 degrees) and increase the pressure at the rear of the vehicle 202. The SDR rear diffuser has several openings 104 that reduce the turbulence of the airflow and make the airflow more laminar. Manufacturers of such SRDs have claimed that their products reduce fuel consumption by 1.4-1.6 liters per 100 kilometers.

However, such SDR rear diffusers have a number of drawbacks. For one, the SDR rear diffuser 102 directs airflow at a high angle of attack, which is not efficient in reducing the total drag by any significant degree. Also, the high angle of attack applies high force on the top rear diffuser 102, which increases the chance of breaking the installed device. Moreover, the SDR rear diffuser 102 does not allow other drag reducing devices, such as a tailboat, to be installed along with the SDR rear diffuser 102 to product a combined drag-reduction effect. In addition, the SDR rear diffuser 102 only focuses on the benefit of the airflow coming from the top of the trailer of the vehicle 202; however, there are other locations that can also benefit from reduction in airflow to reduce the total aerodynamic drag.

The above-described deficiencies of today's SDR systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments described herein relate to a tri-wing system for reducing aerodynamic drag on a ground vehicle. To these and/or related ends, curved wings designed to redirect airflow across the vehicle can be mounted at one or more locations on the vehicle. For example, the wings can be mounted to one or more of a bottom rear of a tractor or cab of the ground vehicle, a top rear surface of a trailer attached to the tractor or cab, and/or a bottom rear surface of the trailer. The wings can be curved to redirect airflow across these surfaces toward lower pressure areas behind the vehicle, thereby increasing the pressure at these lower pressure areas and thus reducing total drag force on the vehicle. This reduction of overall drag can result in a corresponding reduction in fuel consumption.

To the accomplishment of the foregoing and related ends, certain illustrative aspects are described herein in connection with the following description and the annexed drawings. These aspects are indicative of various ways that can be practiced, all of which are intended to be covered herein. Other advantages and novel features may become apparent from the following detailed description when considered in conjunction with the drawings.

BRIEF DESCRIPTION OF THE DRAWINGS

FIG. 5 is an example geometric model of an example, non-limiting tri-wing system.

FIG. 6 is an example geometric model of a combined system comprising a tri-wing system and a tailboat.

FIG. 8 illustrates an example, non-limiting design for a tri-wing system.

FIG. 9 illustrates a bottom rear wing at an end of a trailer.

FIG. 12 is a front view of a rear top wing at a top end of a trailer.

FIG. 13 illustrates a bottom rear wing at a rear bottom of a tractor.

DETAILED DESCRIPTION

Figure 1:
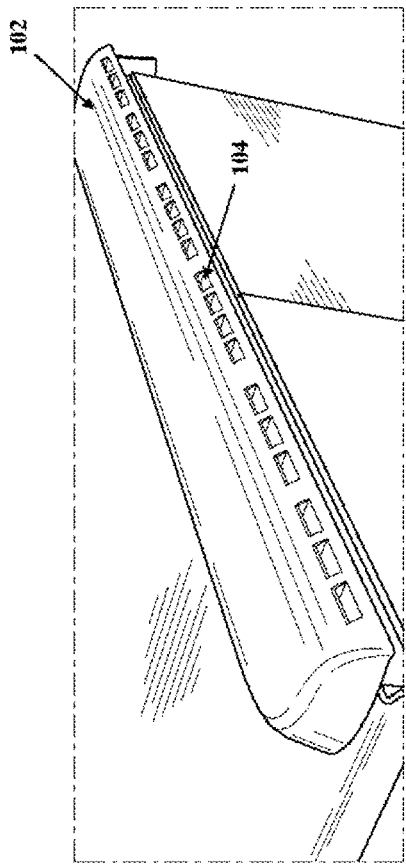
FIG. 1 illustrates an example system drag reduction (SDR) device mounted to the trailer of a vehicle.
Figure 2:
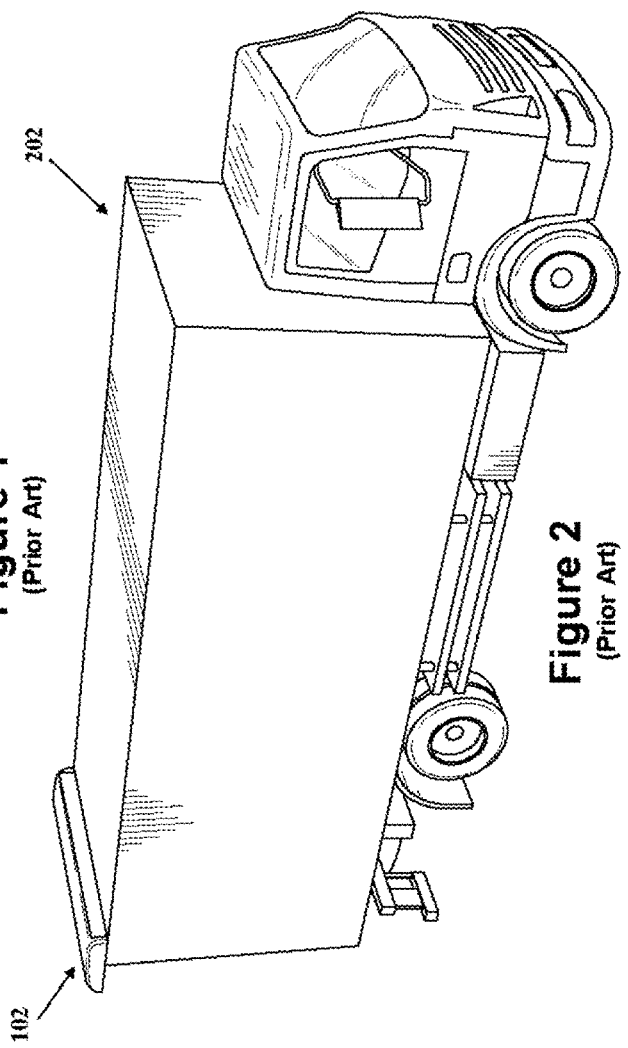
FIG. 2 is a view of a rear spoiler of the SDR device.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

One or more embodiments of the tri-wing system described herein comprise a group of mechanical devices that are applied in the automotive industry. The tri-wing system can be applied on ground vehicles such as tractor trailers, buses, mini-buses, sport utility vehicles (SUVs), etc. The tri-wing system can reduce aerodynamic drag by increasing pressure at low pressure areas located at the rear of the ground vehicle (e.g., behind the vehicle). By increasing the pressure at the rear of the ground vehicle, the total drag force can be reduced, resulting in a corresponding reduction in fuel consumption.

The tri-wing system can direct airflow at or near three locations: 1) from the top rear side of a trailer, 2) from the bottom rear side of the trailer, and 3) from the rear bottom side of the tractor to which the trailer is attached. The tri-wing system differs from the SDR stop rear diffuser 102 described above, in some respects for instance, by its efficiency and design. In one or more example embodiments, the tri-wing system described herein comprises a curved plate that starts at or near an angle of zero degrees and ends at or near an angle of 20 degrees with respect to a horizontal plane defined with respect to the ground vehicle. The tri-wing system thus has a lower angle of attack than SDRs such as rear diffuser 102 described above, and hence the tri-wing system is less vulnerable to breakage.

Figure 3:
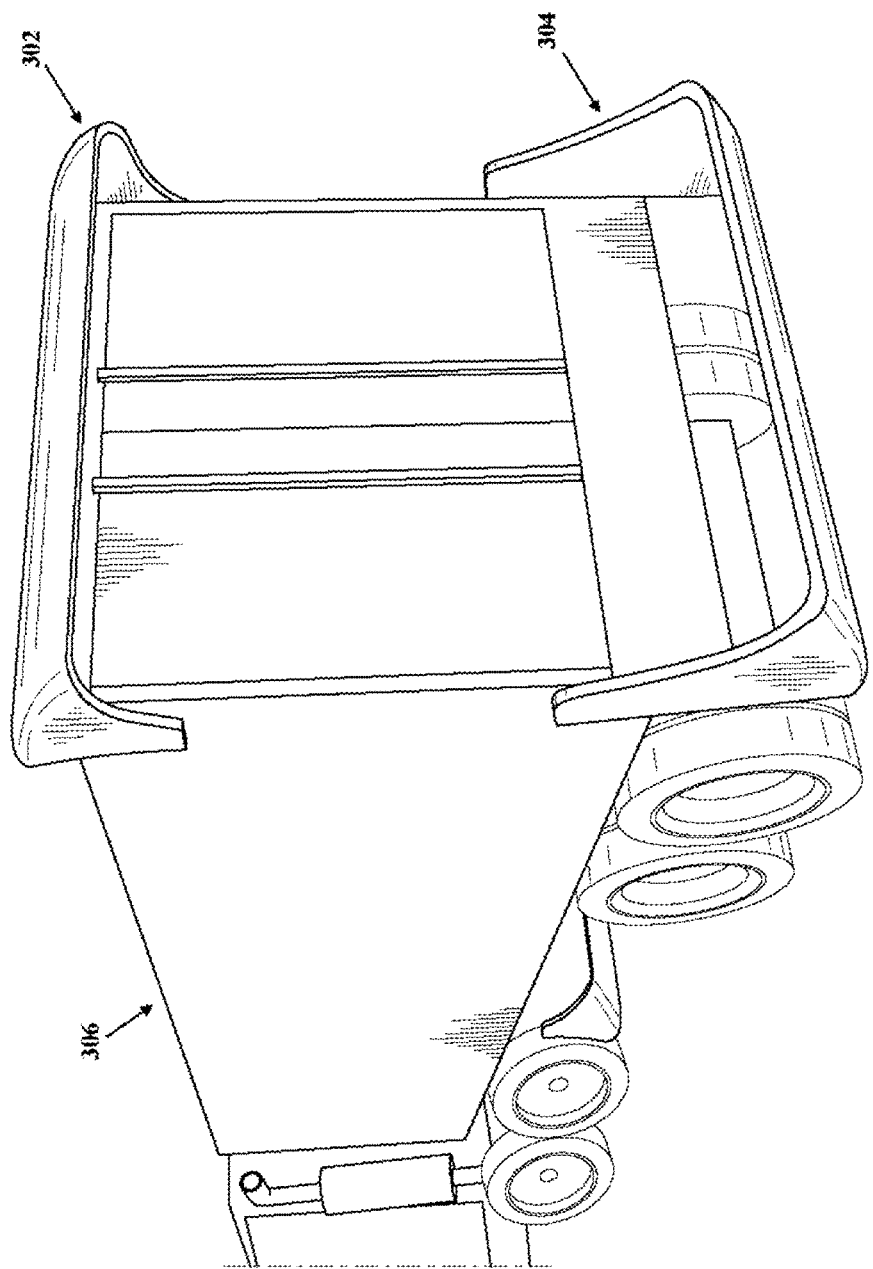
FIG. 3 illustrates an example, non-limiting tri-wing system attached at a rear of a trailer.

FIG. 3 illustrates a side view of an example tri-wing system attached to a tractor trailer 306 according to one or more embodiments. In such embodiments, the tri-wing system comprises one or more mechanical devices that act as one or more wings attached to ground vehicles. In the embodiment illustrated in FIG. 3, the tri-wing system comprises a top wing 302 and a bottom wing 304. Wings 302 and 304 direct airflow from high momentum locations at the top and bottom surfaces of tractor trailer 306 toward lower momentum locations behind tractor trailer 306.

Figure 4:
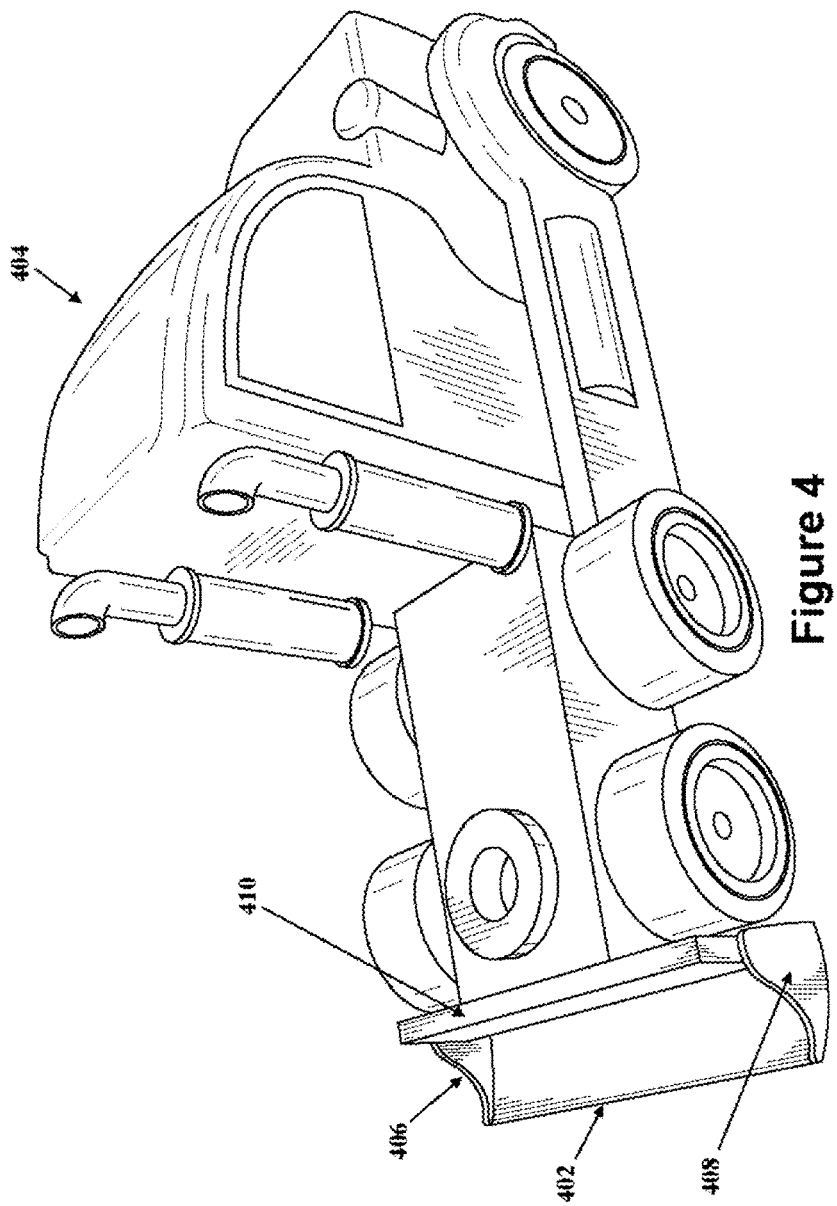
FIG. 4 illustrates an example, non-limiting tri-wing system attached at a rear of a cab.

While FIG. 3 illustrates an embodiment in which the tri-wing system is attached to a trailer, one or more embodiments of the tri-wing system may include a wing attached to the tractor or cab of the vehicle itself. FIG. 4 illustrates an example wing 402 attached at or near the bottom rear of a tractor or cab 404. As depicted in this example, wing 402 mounts to the rear of tractor or cab 404 using mounting supports 406 and 408, which extend from an inner surface of wing 402 and mount to respective sides of a safety guard on the rear of the cab. While FIG. 4 depicts wing 402 as being mounted to cab 404 using mounting supports 406 and 408, other techniques for affixing wing 402 to cab 404 are within the scope of one or more embodiments at this disclosure.

In one or more embodiments, the wings of the tri-wing system can be added to a vehicle such that there is a gap between the vehicle and an inner surface at the top rear wing. The gap may be of any suitable size depending, for example, on the type or shape of vehicle. In some scenarios, it may be found that a gap of less than eight centimeters provides more favorable airflow than a gap greater than eight centimeters. The gap can force the airflow to be directed toward the low pressure areas behind the tractor and/or behind the trailer. In another non-limiting embodiment, the surface length of each wing can be approximately 2.5 meters (e.g., equaling the approximate width of a standard trailer) and can extend behind the tractor and behind the trailer by approximately 0.25 meters. FIG. 5 illustrates a side view cross-section of part of an example, non-limiting tri-wing system attached to a tractor trailer. In this illustrated example, the tri-wing system comprises a top rear wing 502 and a bottom rear wing 504 (which may be similar to wings 302 and 304 of FIG. 3) attached to the trailer 508, and a third wing 506 (which may be similar to wing 402 of FIG. 4) attached to the bottom rear of the tractor or cab 510.

In one or more embodiments, if another surface or drag reducing device is added to the ground vehicle, such as a tailboat, then the wing of the tri-wing system can begin, at a first edge, at an angle of approximately zero degrees relative to a horizontal plane of the vehicle's surface, and end, at the opposite edge, with the same or approximately the same surface angle as the additional drag reducing device.

Figure 7:
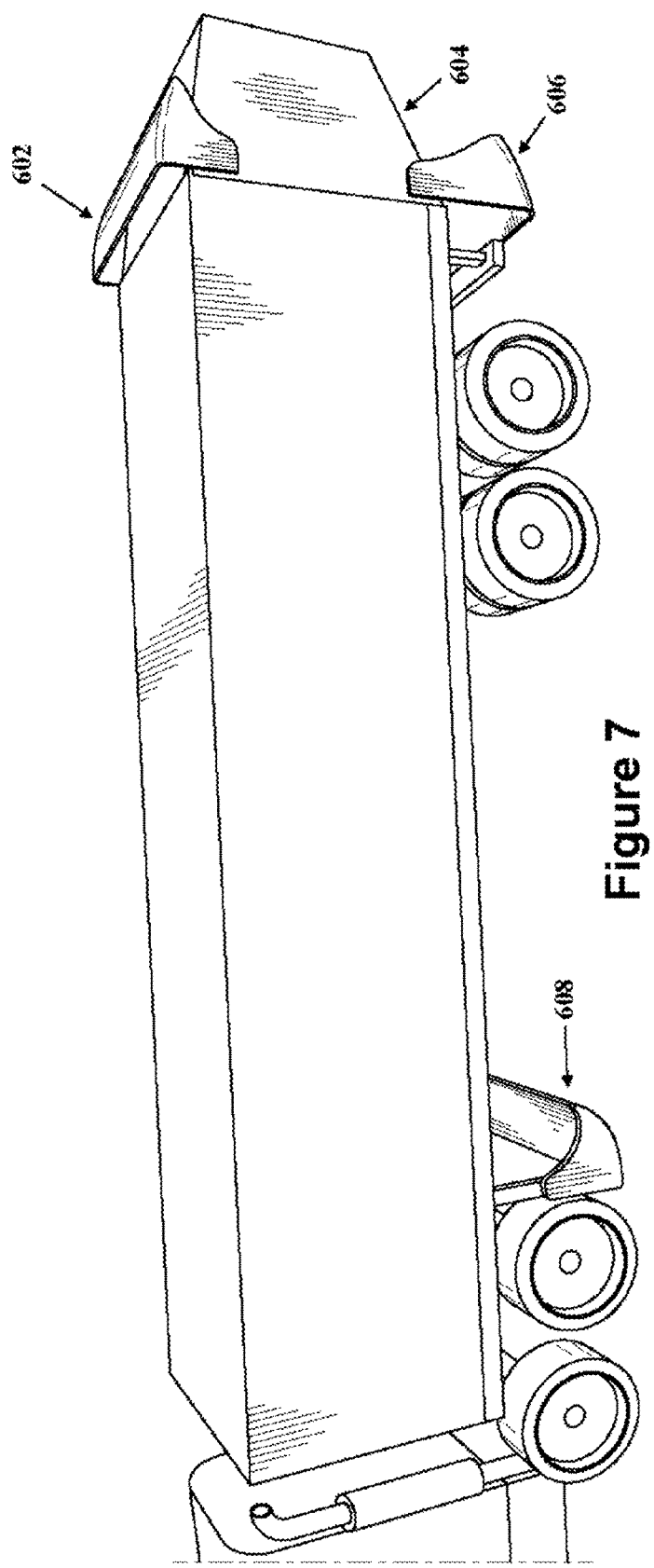
FIG. 7 illustrates a tractor trailer with a tri-wing system and a tailboat.

FIG. 6 illustrates an example of such a configuration. In this example, a tailboat 604 has been added to trailer 610. Accordingly, the top rear wing 602 and bottom rear wing 606 of the tri-wing system have been attached to trailer 610 such that the curve of the wings gradually conform to the top and bottom angles of tailboat 604 (relative to the horizontal planes of the top and bottom of trailer 610). A third wing 608 has been attached to the bottom rear of tractor or cab 612. FIG. 7 illustrates a three-dimensional side view of this configuration.

FIGS. 8-13 illustrate example tri-wing systems from various angles. As illustrated in FIG. 8, upper rear wing 802 and lower rear wing 804 are mounted to the rear of trailer 810 by respective supports 812 and 814. Inner surfaces of wings 802 and 804 facilitate redirection of airflow from high pressure areas near the top and bottom surfaces of trailer 810 to lower pressure areas behind trailer 810, thereby reducing drag on the vehicle. Likewise, the inner surface of wing 806 mounted to the bottom rear of tractor or cab 816 can redirect airflow across the bottom of tractor 816 to lower pressure areas behind tractor 816.

FIG. 9 illustrates another example, non-limiting wing 902 mounted to the bottom rear of a trailer using mounting supports 904, which affix wing 902 to a bottom rear corner of the trailer.

Figure 10:
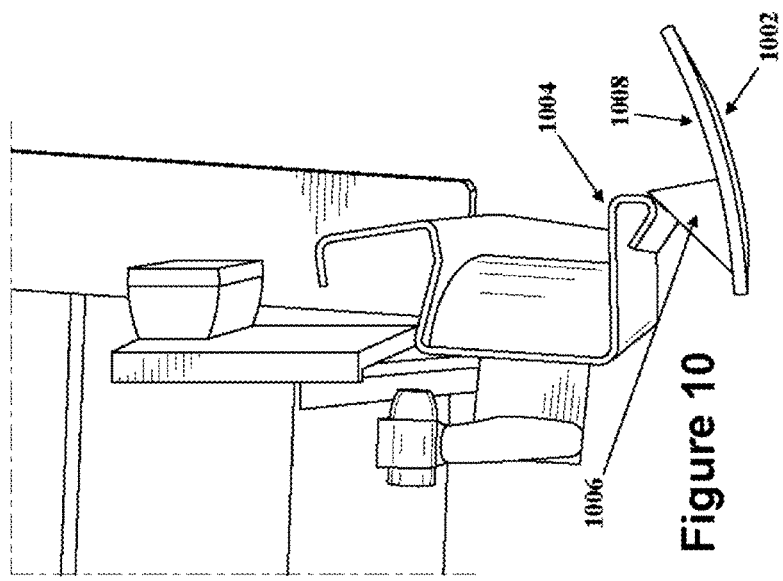
FIG. 10 is a side view of a rear bottom wing at a bottom end of a trailer.

FIG. 10 illustrates a side view of an example, non-limiting wing 1002 mounted to the bottom rear of a trailer. In this example, wing 1002 comprises supports 1006 that are affixed to a bracket 1004 or other surface mounted on the rear of the trailer, such that airflow is directed from the bottom of the trailer to lower pressure areas behind the trailer by inner surface 1008 of wing 1002.

Figure 11:
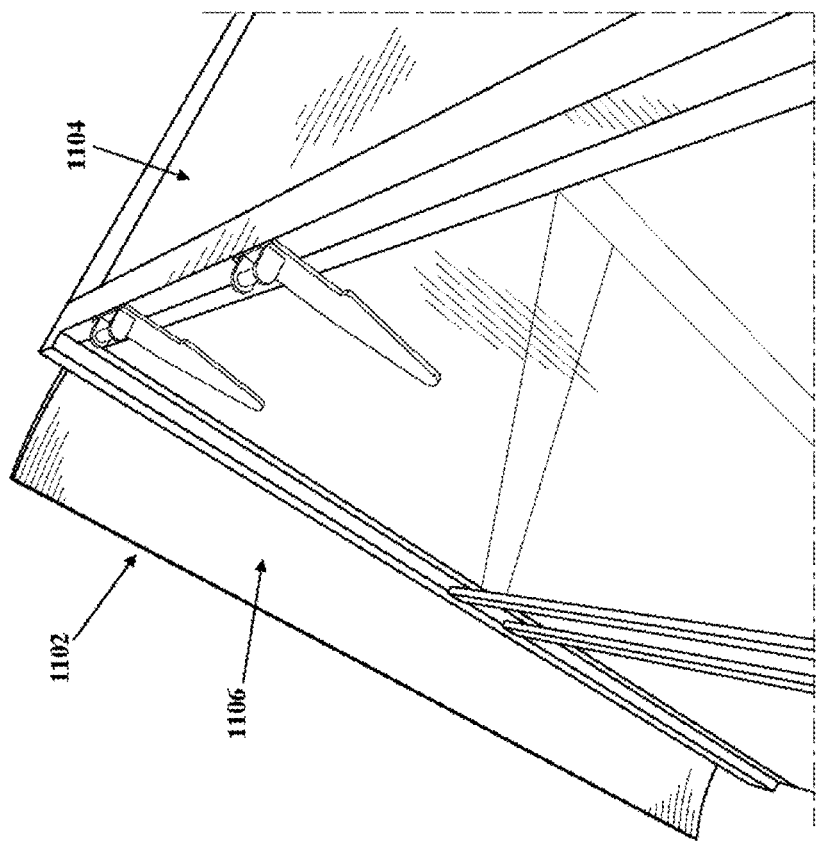
FIG. 11 illustrates an example top rear wing at a top end of a trailer.

FIG. 11 illustrates a view of a top rear wing 1102 mounted to the top rear of a trailer. As described in previous examples, the inner surface 1106 of wing 1102 is curved downward to redirect air from the top surface of trailer 1104 to lower pressure areas behind trailer 1104. FIG. 12 illustrates another view of the top rear wing 1102 viewed from the front of the trailer 1104. In this view, the gap 1202 between the wing 1102 and trailer 1104 can be seen more clearly. During motion of the vehicle, airflow across the top surface of trailer 1104 passes through gap 1202 and is redirected to lower pressure areas behind the trailer by the inner surface of the wing 1102.

FIG. 13 illustrates another view of a wing 1302 mounted to the bottom rear of a tractor or cab. As described above, inner surface 1304 of wing 1302 redirects airflow across the bottom of the tractor or cab toward lower pressure areas behind the tractor or cab.

Variations of the above-described tri-wing system are also contemplated and are within the scope of one or more embodiments of this disclosure. For example, side plates at the left or right sides of the wings may be added to reduce turbulence at the edges of the wings. In another example variation, vortex generators at the outer side of the wings can be added to reduce turbulence of the airflow after the separation from the wing. Also, one or more embodiments of the wing can conform to a National Advisory Committee of Aeronautics (NACA) design, similar to those found on airplane wings, in order to reduce drag on the wing itself.

Embodiments of the tri-wing system were simulated with various results as follows:

1) The addition of a tri-wing system with an ending angle of approximately 20 degrees at the rear of the trailer and at the rear of the tractor reduced the drag force by approximately 20%

2) Small-scale models were built with wings ending at an angle of approximately 20 degrees. In a wind tunnel test, the measured drag force was reduced by approximately 20.8%, compared to a conventional tailboat of approximately 10 degrees, which reduced the drag force by merely 16.6%.

3) Combining a tri-wing system and a conventional 10 degrees tailboat reduced the drag by approximately 25% in another wind tunnel test.

4) A widely deployed tractor trailer test on roads using the tri-wing system showed a fuel consumption reduction of between 7-9%.

Figure 14:
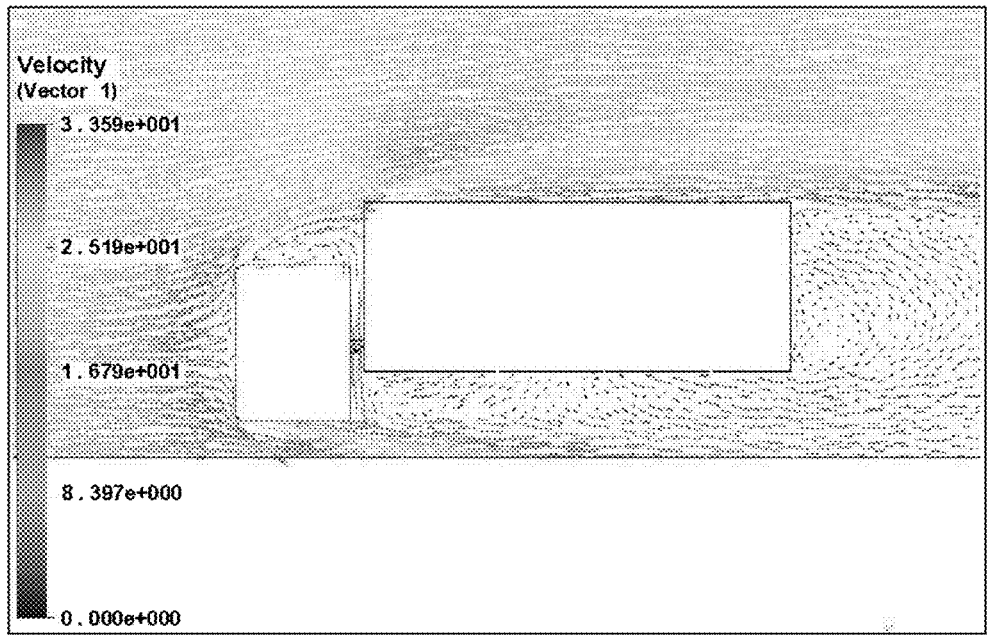
FIG. 14 illustrates a measured airflow on a vehicle prior to installation of a tri-wing system.
Figure 15:
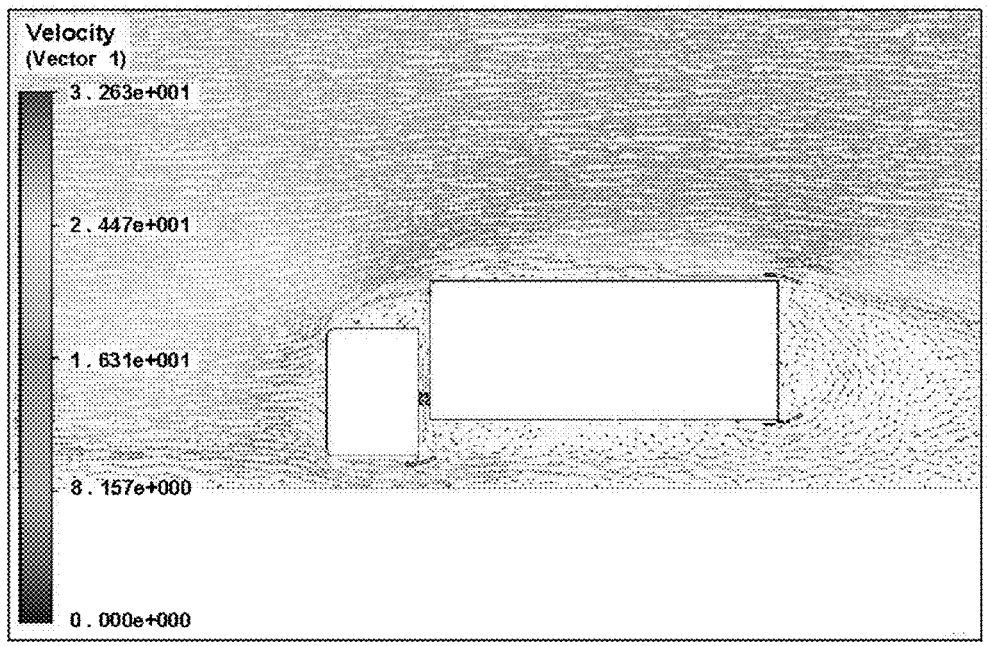
FIG. 15 illustrates a measured airflow on a vehicle after installation of a tri-wing system.

Comparative results can be seen with reference to FIGS. 14 and 15. FIG. 14 is an airflow velocity map illustrating measured airflow on a vehicle prior to installation of a tri-wing system. For comparison, FIG. 15 illustrates measured airflow on the vehicle after installation of an embodiment the tri-wing system described herein.

One or more embodiments of the tri-wing system described and depicted herein comprise or represent one or more of the following aspects.

1) SDR systems typically comprise airflow diffusing devices, whereas the tri-wing system described herein is a directing wing that directs airflow.

2) Rear wings that are currently available typically have their inner surface opposite to the supports' positions; by contrast, the tri-wing system described herein has its inner surface on the same side as the supports.

3) The tri-wing system described herein can be applied on tractor trailers, sports utility vehicles, buses, boxy or otherwise substantially rectangular-shaped vehicles, etc.

In these regards, various embodiments of the tri-wing system play the role of a wing or vane to direct the airflow from high airflow momentum locations at the top and bottom of the tractor trailer toward lower momentum airflow at the rear of the tractor and at the rear of the trailer.

The tri-wing system can be built from any material. For example, one or more embodiments of the tri-wing system can be built from fiberglass, which is known to be both light and sufficiently strong to handle stress from airflow and from impacts by external objects.

Figure 16:
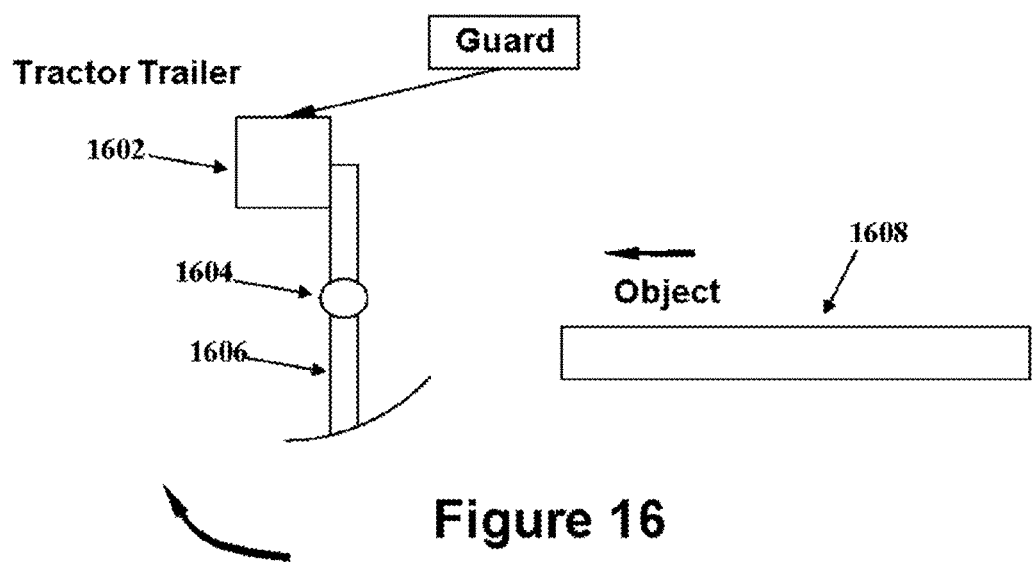
FIG. 16 illustrates an example, non-limiting tri-wing system including a spring.

In addition, one or more embodiments of the tri-wing system can include a spring so that, when the vehicle is hit by an object from the rear, the tri-wing system can substantially absorb the impact while sustaining minimal or no damage. FIG. 16 illustrates an example of such a configuration. In this example, a mounting support 1606 of a wing is mounted to a safety guard 1602 on the lower rear of a tractor trailer using. Mounting support 1606 includes a spring 1604 that allows a degree of rotation of the lower section of mounting support 1606. When an object 1608 impacts the wing, mounting portion can 1606 rotates behind the safety guard, absorbing much of the impact and minimizing damage to the wing.

Preferable mounting tolerances for the tri-wing system are dependent upon a number of factors, including but not limited to the type and shape of the vehicle, prevailing height regulations at a given locality, or other such factors. For example, in some implementations, the tri-wing system's upper part may be located at a height no more than eight centimeters due to total height regulations in the United States. According to another example, the tri-wing system's lower rear wings on the tractor and on the trailer can be adjusted at a location where airflow passes just under the safety guard by approximately two inches.

In some embodiments, the tri-wing system can curve in a circular shape and be extended behind the tractor and the trailer, e.g., such that the wing system pushes additional airflow at the low pressure locations with less drag.

Moreover, the thickness of the wings can be determined based on a thickness determined to handle a force generated by the wings (e.g., a thickness of approximately one centimeter for fiberglass wings may be sufficient to handle the aerodynamic drag force from the wind at a speed of 60 km/hr).

Figure 17:
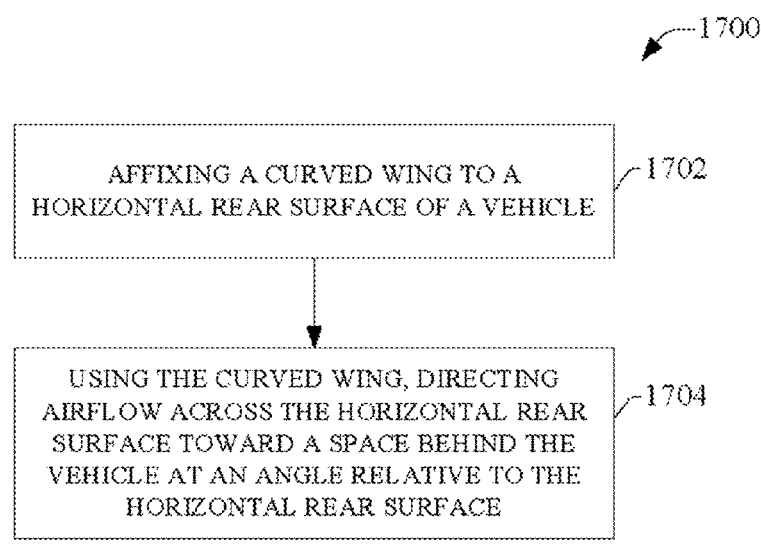
FIG. 17 is a flowchart of an example methodology for reduction of aerodynamic drag of a ground vehicle.

FIG. 17 illustrates a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodology.

FIG. 17 illustrates an example methodology 1700 for reduction of aerodynamic drag on a ground vehicle. Initially, at 1702, a curved wing is affixed to a horizontal rear surface of a vehicle. For example, the curved wing can be affixed to a bottom rear surface of a tractor trailer cab, a sport utility vehicle, or other such vehicles. The curved wing can also be affixed to a vehicular attachment, such a trailer that hitches to a cab or other vehicle. In such configurations, the curved wing can be affixed to the top rear surface or the bottom rear surface of the trailer. Multiple wings can also be attached to the vehicle or vehicular attachment (e.g., on both the top and bottom rear surfaces of the vehicle and/or trailer).

At 1704, the curved wing directs airflow across the horizontal rear surface of the vehicle toward a space behind the vehicle at an angle relative to the horizontal rear surface. In some embodiments, the curve of the wing can be designed such that the rear-most portion of the curve is directed at an angle of less than 20 degrees relative to a horizontal plane of the surface on which the wing is mounted. However, other angles are also contemplated and are within the scope of one or more embodiments of this disclosure.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

What is claimed is:

1. An apparatus, comprising:
    a first wing configured to mount to a lower rear area of a vehicle that is located below a trailer attached to the vehicle, wherein the first wing is curved to direct airflow across a surface of the vehicle toward a first space behind the vehicle and under the trailer;
    a second wing configured to mount to a lower rear area of the trailer, wherein the second wing is curved to further direct the airflow toward a second space behind the trailer; and
    a third wing configured to mount to an upper rear area of the trailer.

2. The apparatus of claim 1, wherein the first wing is mounted to a safety guard of the vehicle.

3. The apparatus of claim 1, wherein the first wing is curved to direct the airflow at an angle of less than or equal to 20 degrees relative to a plane of the surface of the vehicle.

4. The apparatus of claim 1, wherein the first wing is curved to follow or substantially follow an angle of a drag reducing device mounted on a rear of the trailer attached to the vehicle.

5. The apparatus of claim 1, wherein the first wing is further configured to mount to the lower rear area of the vehicle to yield a gap between the surface of the vehicle and an inner surface of the first wing.

6. The apparatus of claim 1, wherein a gap between a surface of the trailer and an inner surface of the third wing is less than eight centimeters.

7. The apparatus of claim 2, wherein a first width of the first wing is equal to or approximately equal to a second width of the vehicle or a third width of the trailer.

8. The apparatus of claim 1, wherein the first wing comprises side plates that extend from an inner surface of the first wing and mount to respective sides of the vehicle.

9. The apparatus of claim 1, wherein the second wing comprises at least one support that is affixed to a bracket mounted on the trailer.

10. The apparatus of claim 1, wherein the third wing is further configured to mount to the trailer using three fixed mounting supports that extend from an inner surface of the third wing.

11. The apparatus of claim 1, wherein one or more mounting supports associated with the first wing comprise a first section and a second section separated by a spring.

12. The apparatus of claim 1, wherein the first wing comprises a substantially circular curve.

13. A system, comprising:
    means for mounting a first vehicular attachment to a location on or near a lower rear of a vehicle that is located below a trailer attached to the vehicle;
    means for mounting a second vehicular attachment to a location on or near a lower rear of the trailer attached to the vehicle;
    means for mounting a third vehicular attachment to a location on or near an upper rear of the trailer;
    means for redirecting airflow across a surface of the vehicle toward an area behind the vehicle at an angle relative to a horizontal plane of the surface of the vehicle via the first vehicular attachment; and
    means for further redirecting the airflow toward another area behind the trailer via the second vehicular attachment.

14. The system of claim 13, wherein the means for redirecting comprises means for redirecting the airflow at an angle that is equal to or less than 20 degrees relative to the horizontal plane.

15. The system of claim 13, wherein the means for mounting the first vehicular attachment comprises means for maintaining a gap between an inner surface of the means for redirecting and the surface of the vehicle.

16. The system of claim 13, wherein the means for mounting the first vehicular attachment comprises means for flexibly rotating the means for mounting the first vehicular attachment about a pivot section.

17. The system of claim 13, wherein the means for mounting the first vehicular attachment comprises means for mounting the first vehicular attachment to a safety guard of the vehicle.

18. A method, comprising:
- affixing a first curved wing to a lower rear surface of a vehicle that is located below a trailer attached to the vehicle;
- affixing a second curved wing to a lower rear surface of the trailer;
- affixing a third curved wing to an upper rear surface of the trailer;
- directing, by the first curved wing, airflow across a surface of the vehicle toward a first space behind the vehicle; and
- directing, by the second curved wing, the airflow toward a second space behind the trailer.

19. The method of claim 18, wherein the affixing the first curved wing comprises affixing the first curved wing to a safety guard of the vehicle.

20. The method of claim 18, wherein the directing comprises directing the airflow at an angle of less than or equal to 20 degrees relative to a plane of the rear surface of the vehicle.

\* \* \* \* \*